United States Patent
Kertz

(10) Patent No.: US 12,520,830 B1
(45) Date of Patent: Jan. 13, 2026

(54) INTERCHANGEABLE INSERT ARRANGEMENT FOR FISHING LURES

(71) Applicant: Michael Ward Kertz, Dallas, TX (US)

(72) Inventor: Michael Ward Kertz, Dallas, TX (US)

( * ) Notice: Subject to any disclaimer, the term of this patent is extended or adjusted under 35 U.S.C. 154(b) by 12 days.

(21) Appl. No.: 18/408,744

(22) Filed: Jan. 10, 2024

Related U.S. Application Data

(62) Division of application No. 17/893,020, filed on Aug. 22, 2022, now Pat. No. 11,889,823.

(60) Provisional application No. 63/235,783, filed on Aug. 22, 2021.

(51) Int. Cl.
*A01K 85/00* (2006.01)
*A01K 85/01* (2006.01)

(52) U.S. Cl.
CPC .......... *A01K 85/029* (2022.02); *A01K 85/011* (2022.02); *A01K 85/017* (2022.02); *A01K 85/1897* (2022.02)

(58) Field of Classification Search
CPC .... A01K 85/1803; A01K 85/16; A01K 85/18; A01K 85/029; A01K 85/017; A01K 85/01; A01K 85/011; A01K 85/012; A01K 85/1847; A01K 85/00
USPC ........... 43/42.47, 42.09, 42.48, 42.31, 42.32, 43/42.33, 42.35
See application file for complete search history.

(56) References Cited

U.S. PATENT DOCUMENTS

| | | | | |
|---|---|---|---|---|
| 2,587,736 A * | 3/1952 | Kindscher | ............... | A01K 85/16 43/42.36 |
| 4,610,103 A * | 9/1986 | Steinman | ............... | A01K 85/01 D22/133 |
| 7,757,425 B2 * | 7/2010 | Herasymchuk | ........ | A01K 85/01 43/42.23 |
| 8,627,594 B1 * | 1/2014 | Weron | ................... | A01K 85/16 43/42.32 |
| 8,720,104 B2 * | 5/2014 | Smith | ..................... | A01K 85/00 43/42.22 |
| 9,713,321 B2 * | 7/2017 | Smith | ..................... | A01K 85/16 |
| 10,159,231 B1 * | 12/2018 | White | ..................... | A01K 85/16 |
| 2008/0104877 A1 * | 5/2008 | Claverie | ................ | A01K 85/00 43/42.09 |
| 2009/0282726 A1 * | 11/2009 | Herasymchuk | ........ | A01K 85/01 43/42.23 |

(Continued)

FOREIGN PATENT DOCUMENTS

FR  3063870 A1 * 9/2018 ............. A01K 85/01

*Primary Examiner* — Darren W Ark
*Assistant Examiner* — Kevin M Dennis
(74) *Attorney, Agent, or Firm* — QuickPatents; Kevin Prince

(57) ABSTRACT

A fishing lure having interchangeable inserts includes a lure body having a front end, a rear end, a left side, a right side, a top side, and a bottom side. At least the left side, but in some embodiments also the right side, includes an insert slot with an opening proximate the rear end. The insert slot has at least one pair of opposing flanges. An insert engages the insert slot and has a catch at a forward end thereof adapted for engaging the snap aperture of the lure body. An outer surface of the insert with a natural attractant is visible through the insert slot between the flanges. The insert is preferably one of many available inserts that all have varying outer surface characteristics, such as color, pattern, texture, attachments, and the like. A fishing lure attachment cooperative with the inserts is used with existing fishing lures.

5 Claims, 10 Drawing Sheets

(56) References Cited

U.S. PATENT DOCUMENTS

| | | | |
|---|---|---|---|
| 2013/0205643 A1* | 8/2013 | Smith | A01K 85/00 43/42.09 |
| 2016/0000057 A1* | 1/2016 | Mistilis | A01K 85/01 43/42.12 |
| 2016/0007581 A1* | 1/2016 | Davidson | G02B 13/06 359/809 |
| 2016/0165866 A1* | 6/2016 | LaMey | A01K 85/18 43/42.09 |

* cited by examiner

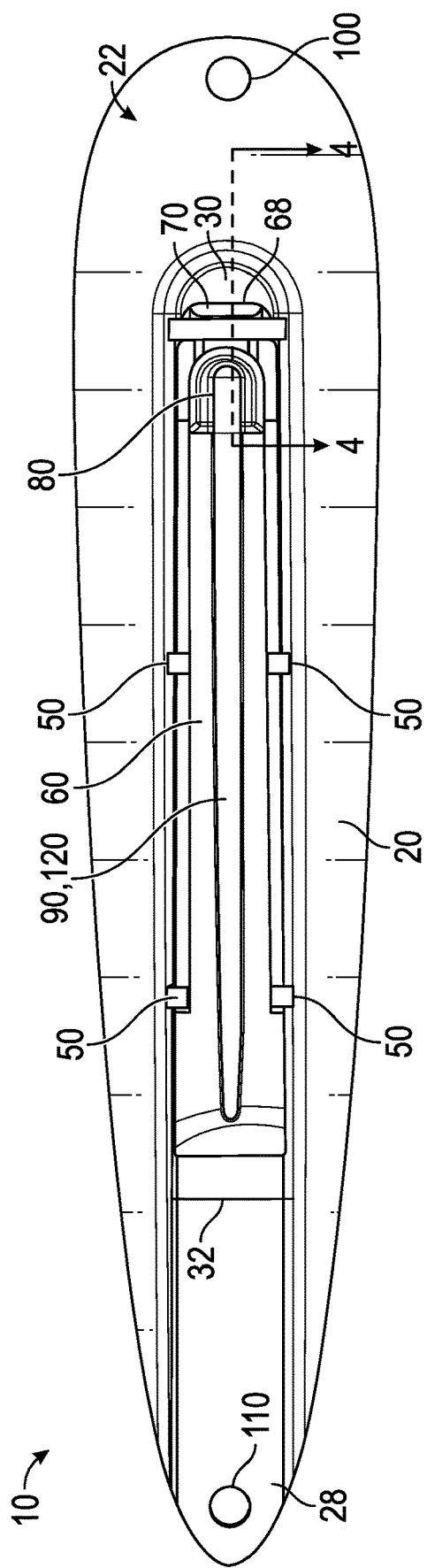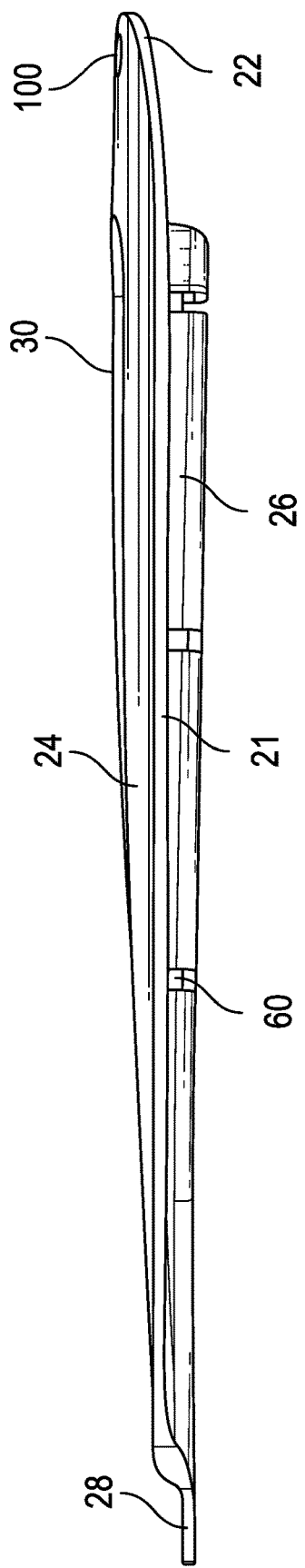
FIG. 2
FIG. 3

INTERCHANGEABLE INSERT ARRANGEMENT FOR FISHING LURES

CROSS-REFERENCE TO RELATED APPLICATIONS

This application is a Divisional of U.S. patent application Ser. No. 17/893,020, filed on Aug. 22, 2022, which itself claimed the benefit of U.S. Provisional Patent Application 63/235,783, filed on Aug. 22, 2021, both applications being incorporated herein by reference.

STATEMENT REGARDING FEDERALLY SPONSORED RESEARCH AND DEVELOPMENT

Not Applicable.

FIELD OF THE INVENTION

This invention relates to fishing, and more particularly to a fishing lure with interchangeable inserts.

BACKGROUND

Currently, there are several visual solutions designed to attract fish to artificial hard body and spoon-type fishing lures. These solutions attempt to appeal to various species of fish, but these solutions fail to meet some of the needs of the industry because they do not differ substantially from past hard body fishing lure and spoon-type fishing lure visual designs. The current appearance of hard body fishing lures and spoon-type fishing lures does not take full advantage of naturally occurring vibrant colors, naturally occurring shapes and naturally occurring patterns. As such, the hard body fishing lure and spoon-type fishing lure markets lacks choices for nature-based lures that exhibit natural phenomena and simplify presentation-changing efforts.

Hard body fishing lure and spoon-type fishing lure solutions are unable to meet other basic needs of their markets because the solutions lack presentation changing versatility and presentation changing simplicity. The hard body fishing lures and spoon-type fishing lures on the market today require the angler to either: 1) open a clasp or a similar fastening device, remove a lure, re-attach a lure and close the fastening device, or 2) cut a line, remove the lure, attach another lure and then retie the line when needing to change their presentation.

Hard body fishing lure and spoon-type fishing lure manufacturers have not developed a lure that uses interchangeable natural attractants. Therefore, a need exists for a fishing lure that allows anglers the option of using interchangeable snap-lock inserts that display natural products, or their synthetic substitutes, on suitable hard body or spoon-type fishing lures. Such a needed invention would allow for quick interchange of the inserts, without requiring removing the lure from a fishing line. Such inserts would preferably be useable with a wide variety of lure types, shapes, and sizes. The present invention accomplishes these objectives.

SUMMARY OF THE INVENTION

The present device is a fishing lure having interchangeable inserts. A spoon-type embodiment of the fishing lure includes a lure body having a front end, a rear end, a left side, a right side, a top side, and a bottom side. The left side of the lure body includes an insert slot with an opening proximate the rear end of the lure body. The insert slot terminates proximate the front end at a snap aperture. The insert slot has at least one pair of opposing flanges. In alternate embodiments that are a mirror image of the fishing lure, the insert slot is located on the right side of the lure body.

An insert engages the insert slot and has a catch at a forward end thereof. The catch is adapted for engaging the snap aperture of the lure body. A handle, preferably proximate the forward end of the insert, is adapted for manual manipulation to facilitate insertion and removal of the insert from the insert slot. An outer surface of the insert is visible through the insert slot between the flanges when the insert is engaged with the insert slot. The insert is preferably one of many available inserts that all have varying outer surface characteristics, such as color, pattern, texture, attachments, and the like. As such, the fishing lure does not have to be removed from a fishing line if an effective insert is available to use with the fishing lure. Preferably all such inserts are adapted for use with various types of hard body lures, spoon-type lures, or other lures having one or more of the insert slots.

The front end of the lure body has a fishing line aperture therethrough for receiving a fishing line or the like, and the rear end of the lure body includes a fishing hook aperture therethrough for attaching spinner hardware, a clasp, or the fishing line from a fishing pole, for example. A fishing hook is attached with the fishing hook aperture with an attachment ring, such as a split ring, or the like, as is known in the art.

In use, the insert is inserted into the insert slot at the insert slot opening proximate the rear end of the lure body. The catch at the forward end of the insert engages the snap aperture of the lure body, thereby containing the insert within the insert slot. The insert is removed from the lure body by depressing the catch at the forward end of the insert to withdraw the catch from the snap aperture with a flat-bodied tool such as a regular screwdriver or knife. The insert is thereby released from the lure body and can be slid away from the lure body through the insert slot opening. A gap between the forward end of the insert and the lure body provides a volume for the insert to be deformed inwardly when the catch is depressed to release the catch from the snap aperture.

Preferably the natural attractant is fixed with the insert and is visible through the insert slot between the at least one pair of flanges when the insert is engaged with the insert slot of the lure body.

In alternate embodiments of the invention the lure body includes two body halves that are each fixed together to form an internal volume therewithin. Each body half includes one of the insert slots, such that each such embodiment holds two of the inserts, one on the left side of the lure body, and one on the right side of the lure body.

Such embodiments preferably include a diver lip fixed with the front end of the lure body. The diver lip includes the fishing line aperture therethrough. In some embodiments, a clevis pin is fixed through the fishing line aperture of the diver lip, the clevis pin providing another of the fishing line apertures therethrough proximate a top side for connecting with a fishing line to pull the lure body through the body of water. A diver lip slot of the front end of the lure body is adapted to receive the diver lip therein.

In a simplified embodiment of the invention, a lure body attachment is adapted to be attached to an existing fishing lure. The lure body attachment has the front end, the rear end, the left side, the right side, the top side, and the bottom side. The left side of the lure body attachment includes the insert slot with the opening proximate the rear end of the lure body attachment. The insert slot terminates proximate the front end of the lure body attachment at the snap aperture. The insert slot has at least one pair of the opposing flanges. The inserts engage the insert slot of the lure body attachment in the same way as described for the insert slots of the fishing lure. The right side of the lure body attachment fixes to the fishing lure, and preferably a substantially flat or only slightly curved side of the fishing lure, typically with an adhesive such as a waterproof epoxy adhesive, or the like.

The present invention is a fishing lure that allows anglers the option of using interchangeable snap-lock inserts that display natural products, or their synthetic substitutes, on suitable hard body or spoon-type fishing lures. The fishing lure allows for quick interchange of the inserts, without requiring removing the lure from a fishing line. Such inserts are useable with a wide variety of lure types, shapes, and sizes. Other features and advantages of the present invention will become apparent from the following more detailed description, taken in conjunction with the accompanying drawings, which illustrate, by way of example, the principles of the invention.

DESCRIPTION OF THE DRAWINGS

FIG. 2 is a left-side elevational view thereof, illustrated with the insert engaged with the insert slot;

FIG. 3 is a bottom plan view of the embodiment of FIG. 2;

DETAILED DESCRIPTION OF THE PREFERRED EMBODIMENT

Figure 1:
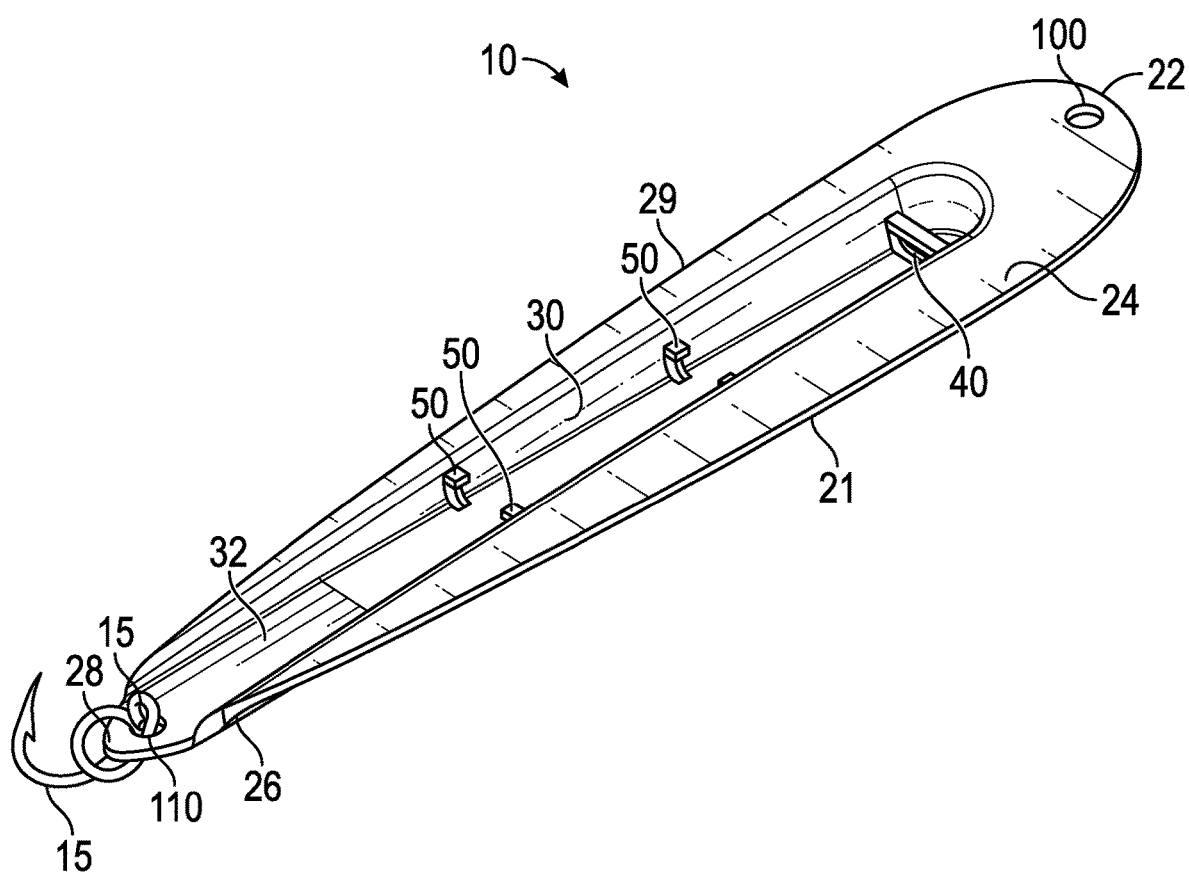
FIG. 1 is a left-side perspective view of a first embodiment of the invention, illustrated with an insert slot empty of an interchangeable insert.
Figure 4:
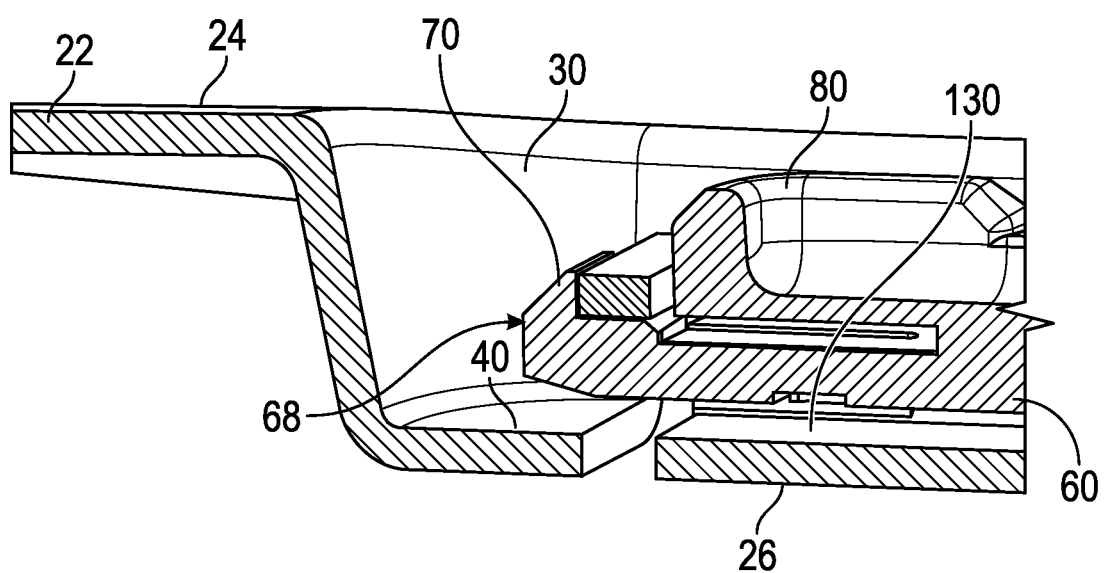
FIG. 4 is an enlarged, partial, cross-sectional view taken generally along line 4-4 of FIG. 2.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate a spoon-type embodiment of a fishing lure 10 that includes a lure body 20 having a front end 22, a rear end 28, a left side 24, a right side 26, a top side 29, and a bottom side 21. Such a spoon-type embodiment is preferably metallic, oblong and may be concave, like a spoon utensil, for attracting fish with reflected light.

The left side 24 of the lure body 20 includes an insert slot 30 with an opening 32 proximate the rear end 28 of the lure body 20. The insert slot 30 terminates proximate the front end 22 at a snap aperture 40. The insert slot 30 has at least one pair of opposing flanges 50.

An insert 60 engages the insert slot 30 and has a catch 70 at a forward end 68 thereof. The catch 70 is adapted for engaging the snap aperture 40 of the lure body 20. A handle 80, preferably proximate the forward end 68 of the insert 60, is adapted for manual manipulation to facilitate insertion and removal of the insert 60 from the insert slot 30. An outer surface 90 of the insert 60 is visible through the insert slot 30 between the flanges 50, when the insert 60 is engaged with the insert slot 30. Alternate mechanisms for selectively engaging the insert 60 with the insert slot 30 may be utilized, such as a friction fit arrangement with detents (not shown), one or more humps (not shown) projecting away from the insert 60 to engage one or more recesses (not shown) in the insert slot 30, which is also a form of a frictional engagement between the insert 60 and the insert slot 30, or the like. One or more spring-loaded plungers (not shown), urged into the insert slot 30, may also be used, such spring-loaded plungers moved away from the insert slot 30 when the insert 60 is inserted into the insert slot 30, and whereupon reaching a fully engaged position, such spring-loaded plungers move into retaining apertures (not shown) of the insert 60 to secure the insert 60 within the insert slot 30. Alternately, the insert 60 may be retained within the insert slot 30 by using one or more magnets (not shown), suction cups (not shown), mechanical snap fasteners (not shown), hook-and-loop type fasteners (not shown), interlocking mushroom type fasteners (not shown), The insert 60 is preferably one of many available inserts 60 that all have varying outer surface 90 characteristics, such as color, pattern, texture, attachments, and the like. For specific types of fish, such as trout for example, an insert 60 having a natural attractant 120 that resembles salmon eggs may be highly effective at attracting fish to the fishing lure 10.

Figure 12:
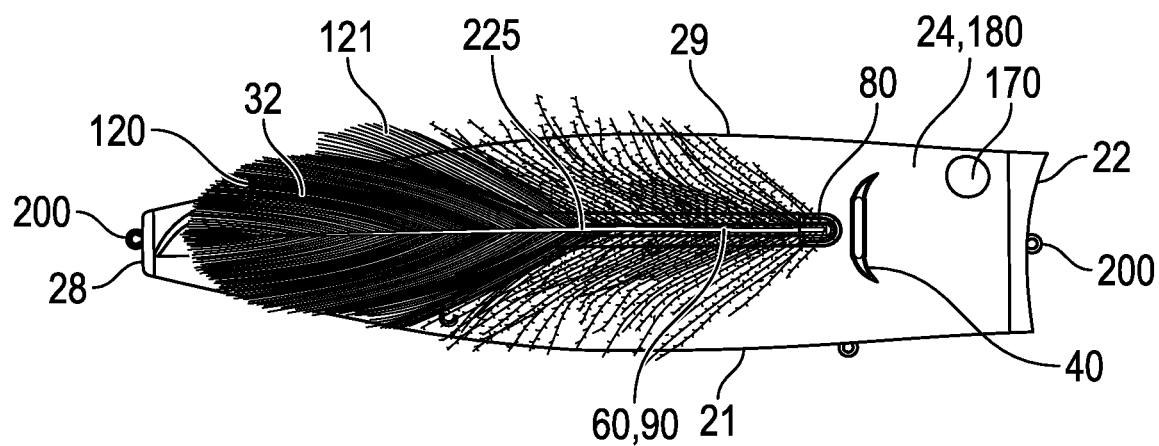
FIG. 12 is a left-side elevational view of yet another embodiment of the invention.
Figure 13:
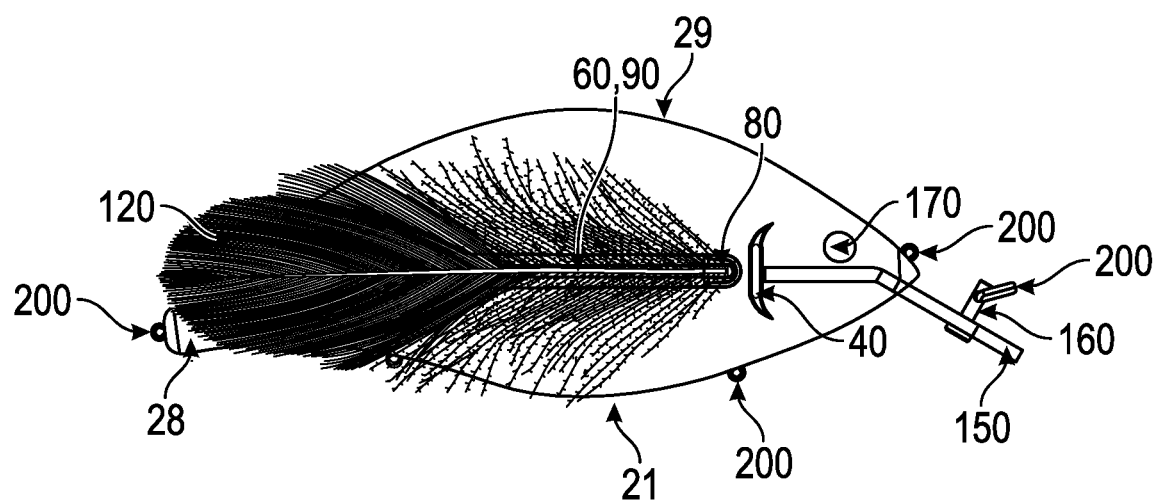
FIG. 13 is a left-side elevational view of yet another embodiment of the invention.

Other natural attractants 120 may include feathers, gemstones, animal skins, reptile skins, insect wings, or the like, adhered or otherwise attached to the insert 60. Certain natural attractants 120 such as some feather types may require a groove or other distinctive surface feature to facilitate the adhesion of the natural attractant 120 to the insert 60. As an example, for suitable types of feathers 121 (FIG. 12), a silicone-based or polyether-based waterproof sealant and/or adhesive is applied to a groove 220 in the outer surface 90 of the insert 60. A shaft 225 of the feather 121 is placed into the groove 220 and pressure is applied to the shaft 225 of the feather 121 until the shaft 225 of the feather bonds to the groove 220 of the insert 60. The natural attractant 120 is positioned on the outer surface 90 so as to not interfere with the flanges 50 when the insert 60 is slid into and out of the insert slot 30.

Figure 5:
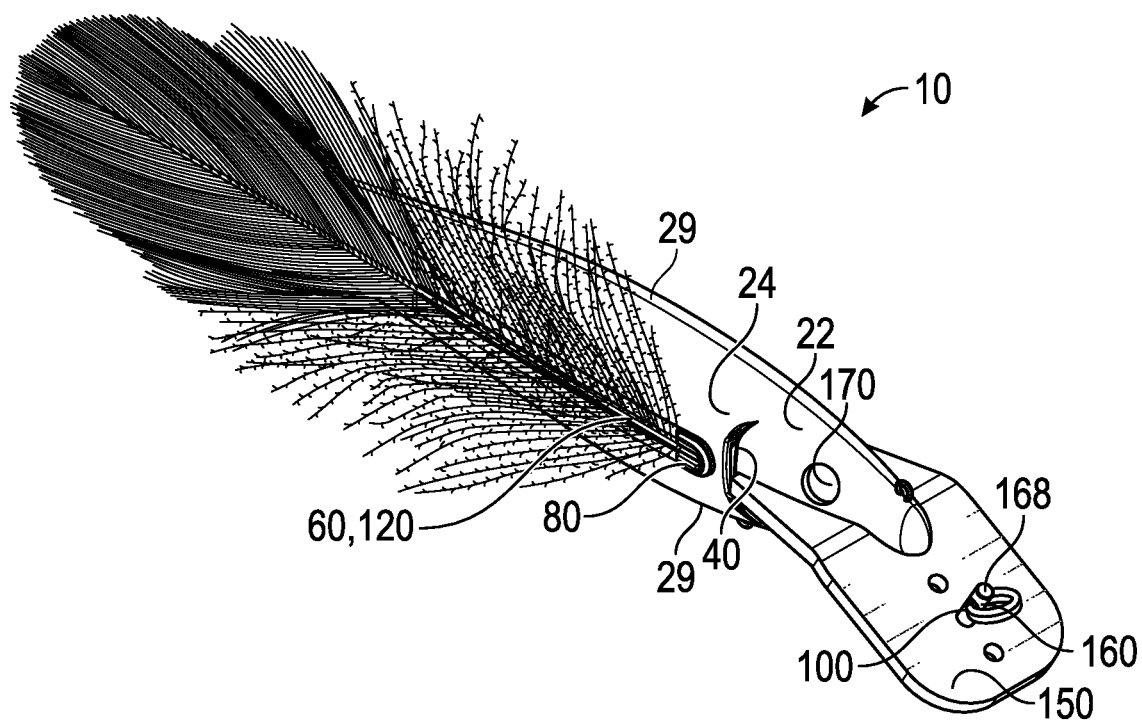
FIG. 5 is a front top perspective view of a second embodiment of the invention.
Figure 6:
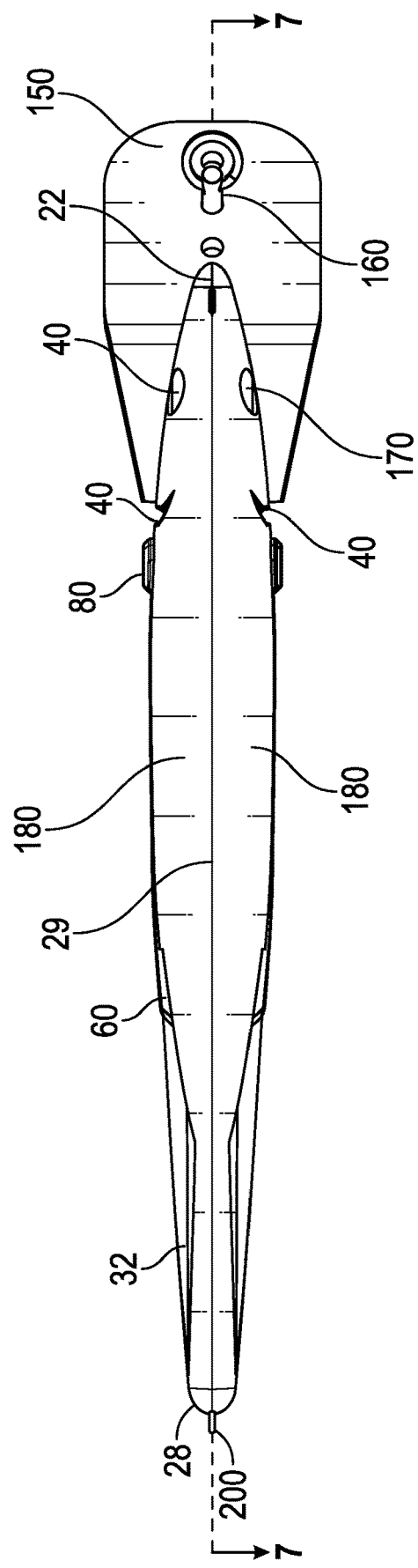
FIG. 6 is a top plan view thereof.
Figure 7:
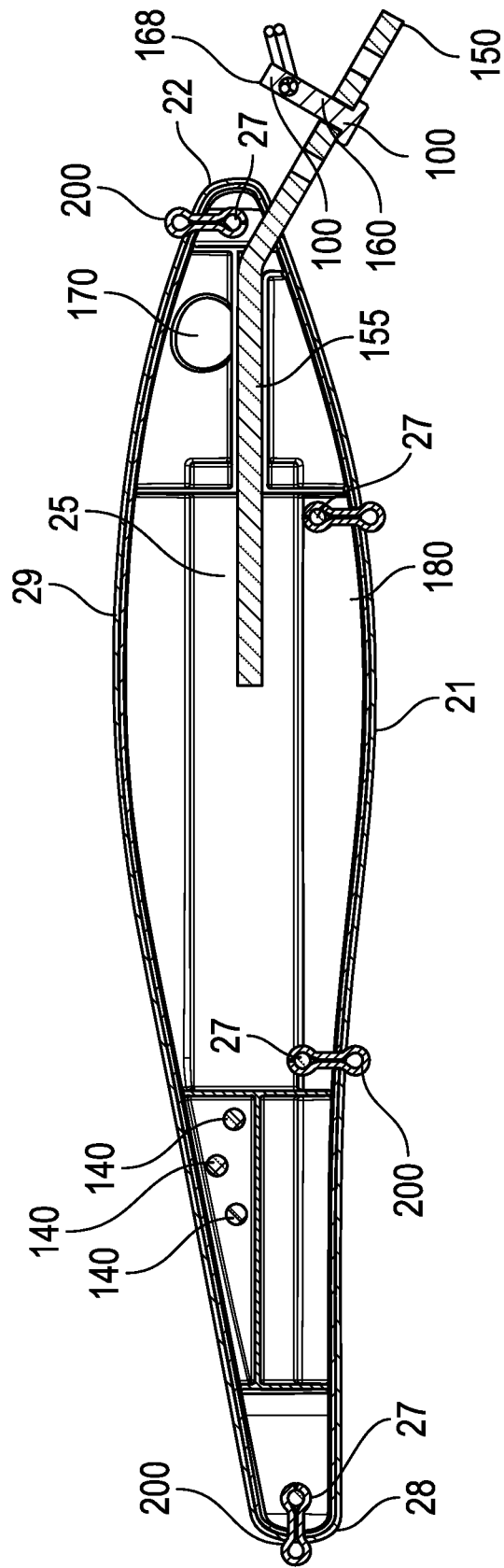
FIG. 7 is a cross-sectional view thereof, taken along line 7-7 of FIG. 6.
Figure 8:
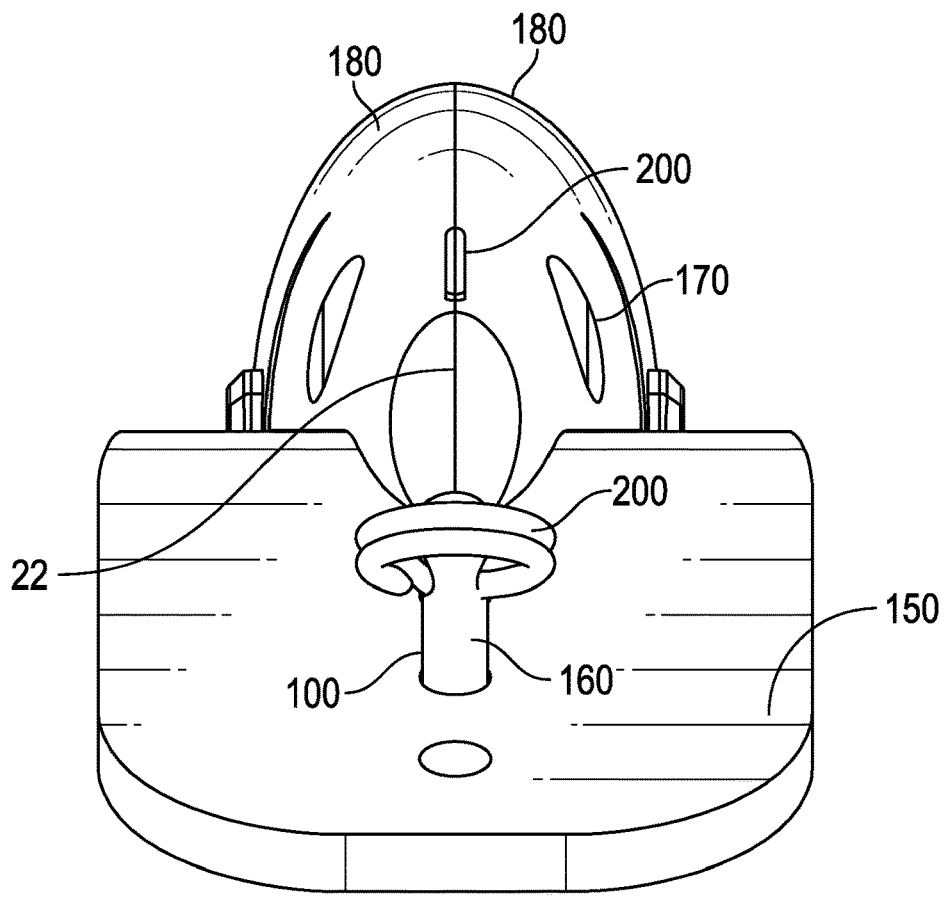
FIG. 8 is a front elevational view thereof.
Figure 9:
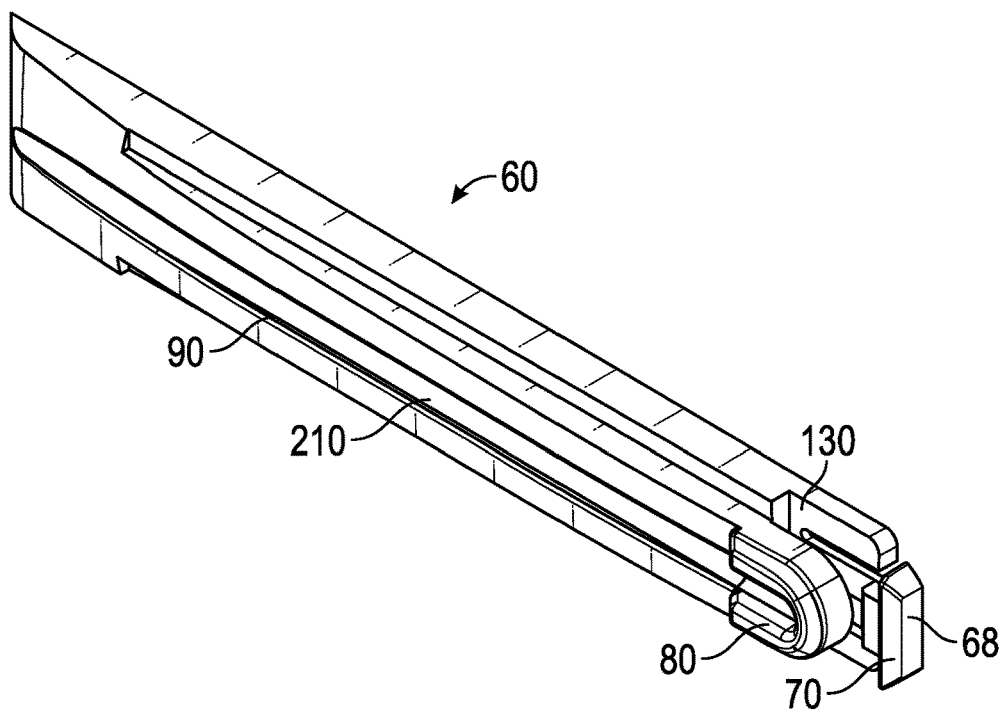
FIG. 9 is a front top perspective view of one embodiment of the insert.
Figure 10:
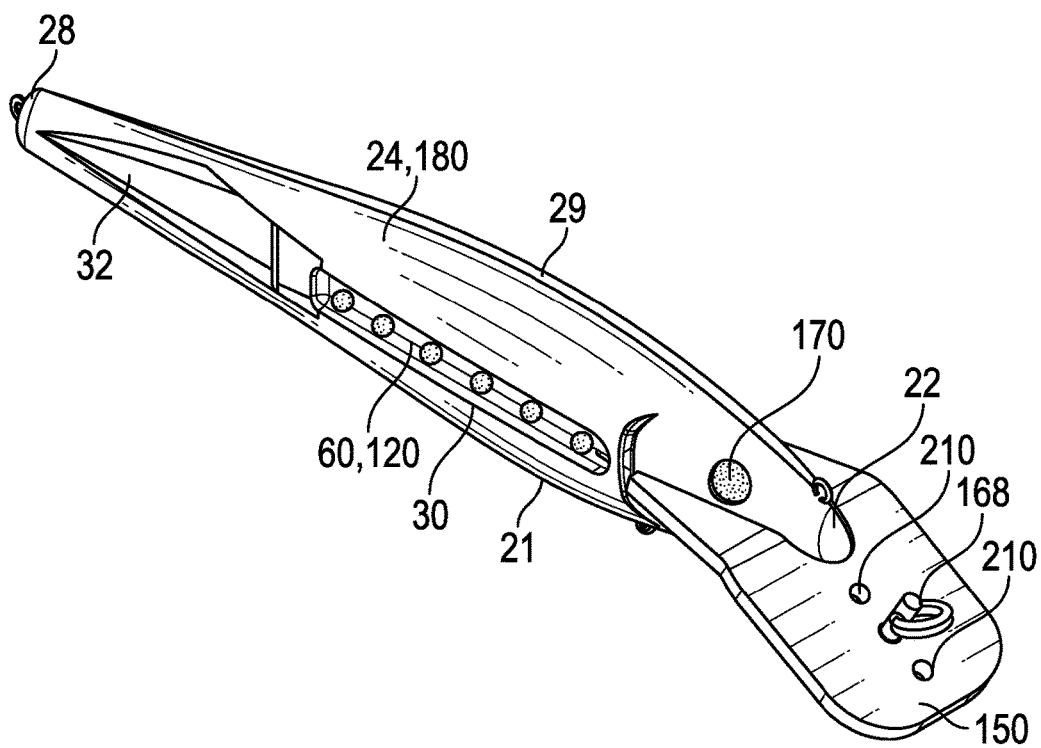
FIG. 10 is a front top perspective view of an alternate embodiment of the invention.
Figure 11:
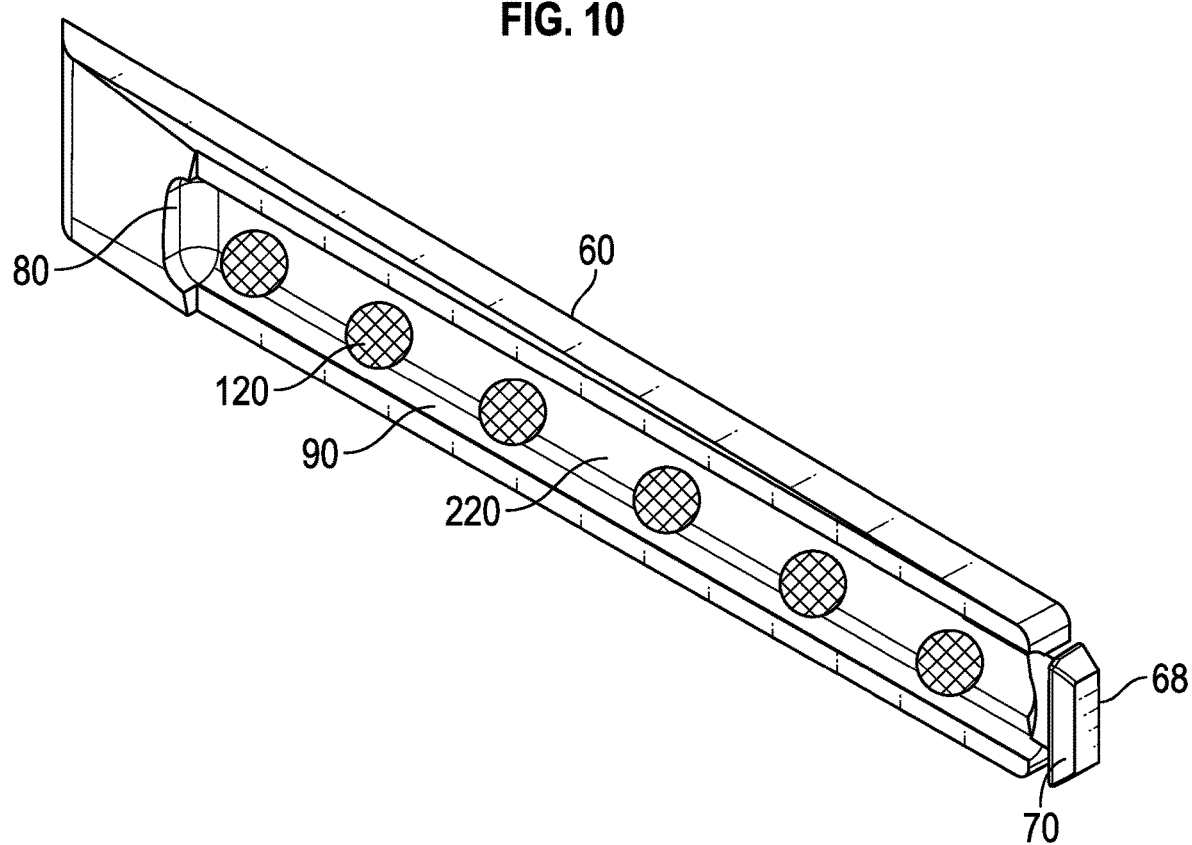
FIG. 11 is a front top perspective view of a second embodiment of the insert.

As such, the fishing lure 10 does not have to be removed from a fishing line if an effective insert 60 is available to use with the fishing lure 10. Such inserts 60 may incorporate an absorbent bait scent receiver (not shown) for receiving scents made from gels, pastes, sauces, oils, or any other bait product (dead or alive). Such inserts 60 may further include a recess 210 (FIG. 11) for receiving the bait scent products or malleable products such as tungsten putty (not shown) to add weight to the fishing lure 10. Preferably all such inserts 60 are adapted for use with various types of hard body lures 10 (FIG. 5), spoon-type lures 10 (FIG. 1), or other lures 10 having one or more of the insert slots 30.

The front end 22 of the lure body 20 has a fishing line aperture 100 therethrough for receiving a fishing line (not shown) or the like, and the rear end 28 of the lure body 20 includes a fishing hook aperture 110 therethrough for attaching spinner hardware, a clasp, or the fishing line (all not shown) from a fishing pole, for example. A fishing hook 15 is attached with the fishing hook aperture 110 with an attachment ring 200, such as a split ring, or the like, as is known in the art.

In use, the insert 60 is inserted into the insert slot 30 at the insert slot opening 32 proximate the rear end 28 of the lure body 20. The catch 70 at the forward end 68 of the insert 60 engages the snap aperture 40 of the lure body 20, thereby containing the insert 60 within the insert slot 30. The insert 60 is removed from the lure body 20 by depressing the catch 70 at the forward end 68 of the insert 60 to withdraw the catch 70 from the snap aperture 40, typically facilitated by grasping the handle 80. A fingernail or flat-bodied tool (not shown) can be used to depress the catch 70. The insert 60 is thereby released from the lure body 20 and can be slid away from the lure body 20 through the insert slot opening 32. A gap 130 (FIG. 4) between the forward end 68 of the insert 60 and the lure body 20 provides a volume for the insert 60 to be deformed inwardly when the catch 70 is depressed to release the catch 70 from the snap aperture 40.

Preferably the natural attractant 120 is fixed with the insert 60 and is visible through the insert slot 30 between the at least one pair of flanges 50 when the insert 60 is engaged with the insert slot 30 of the lure body 20.

In alternate embodiments of the invention, illustrated in FIGS. 5-8, 10, and 12-13, the lure body 20 includes two body halves 180 that are each fixed together to form an internal volume 25 therewithin. Each body half 180 includes one of the insert slots 30, such that each such embodiment holds two of the inserts 60, one on the left side 24 of the lure body 20, and one on the right side 26 of the lure body 20. With embodiments wherein the lure body 20 is made with a thermoplastic material, the two body halves 180 are fixed together with an ultrasonic bonding method, a bonding agent, an adhesive, or the like. Cooperative interlocking mechanical fastener posts and recesses 27 may also be used, either with ultrasonic bonding or the like, or alone, provided a friction fit between such fastener posts and recesses is sufficient to hold the two body halves 180 together, as is known in the art.

Such embodiments may include noise making elements 140 (FIG. 7), such as ball bearings, contained within the internal volume 25 of the lure body 20. When such a fishing lure 10 is pulled through a body of water (not shown), the lure body 20 shimmies back and forth causing the noise making elements 140 to strike each other and an internal surface of each body half 180 to produce noise that can be attractive to various types of fish.

Such embodiments preferably include a diver lip 150 fixed with the front end 22 of the lure body 20. The diver lip 150 includes the fishing line aperture 100 therethrough. A diver lip slot 155 of the front end 22 of the lure body 20 is adapted to receive the diver lip 150 therein. In some embodiments, a clevis pin 160 is fixed through the fishing line aperture 100 of the diver lip 150, the clevis pin 160 providing another of the fishing line apertures 100 therethrough proximate a top side 168 for connecting with a fishing line (not shown) to pull the lure body 20 through the body of water. There may be multiple fishing line apertures 100 on the diver lip 150 so that an angler may decide where on the diver lip 150 the clevis pin 160 should be attached, which alters the movement of the fishing lure 10 as it is pulled through the body of water.

Preferably such embodiments also include one or more lure eyes 170 fixed proximate the front end 22 of the lure body 20. Such lure eyes 170 may include cut glass, quartz glass, crystal glass, gemstones, silica, quartz sand, any combination thereof, or any other material or product suitable for simulating eyes of a bait or fish. The lure eyes 170 are mechanically coupled to the lure body 20 with an adhesive, ultrasonic bonding technique, press-fit into receptacles (not shown) formed into the lure body 20, or the like. Further, a decorative outer layer (not shown) may be applied to the lure body 20 either by painting, by applique, or the like.

In alternate embodiments, the lure body includes the two insert slots 30 on the lure body 20, but is integrally formed from an injection molded plastic material. As such, the internal volume 25 is filled with the injection molded plastic material. Any of the components may be made, as desired or as suitable, with a thermoset plastic, a thermoplastic, a cellulosic plastic, wood, metal or metal or metallic alloys, aluminum or aluminum alloys, steel or stainless steel alloys, vinyl, rubber or any rubberlike material (including, but not limited to, styrene-butadiene rubber, polybutadiene rubber, EPDM rubber, silicone rubber, neoprene rubber, nitrile rubber, butyl rubber, timprene, synthetic rubber, foam rubber, sponge rubber), nylon, cork, neoprene, canvas, composite-type materials, any material used in the injection molding process, or any combination thereof for one or more components of this fishing lure 10, including any hooks 15.

Figure 14:
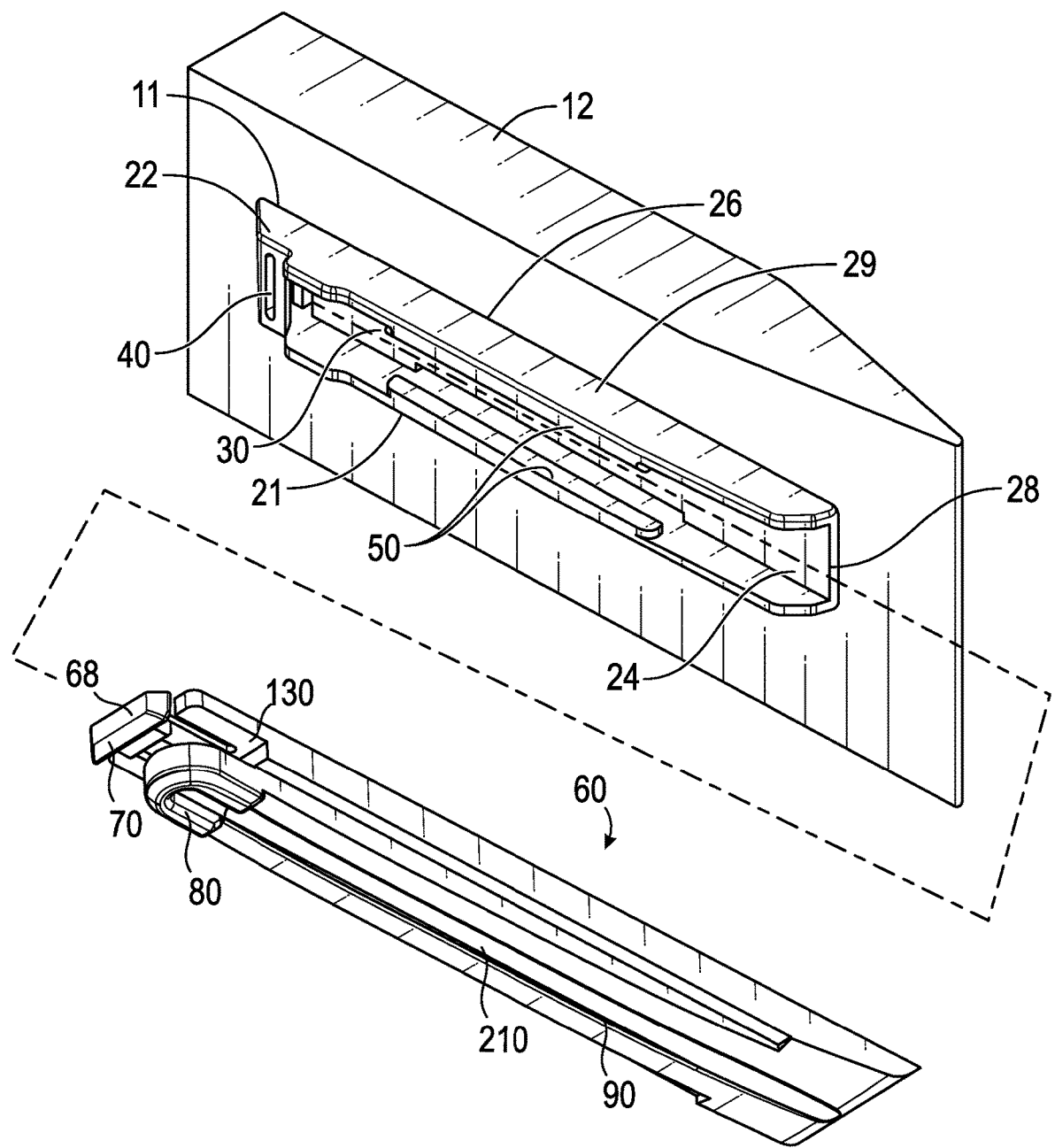
FIG. 14 is an exploded perspective view of a simplified embodiment of the invention that includes a lure body attachment that can be affixed with a pre-existing fishing lure.

In a simplified embodiment of the invention, a lure body attachment 11 (FIG. 14) is adapted to be attached to an existing fishing lure 12. The lure body attachment 11 has the front end 22, the rear end 28, the left side 24, the right side 26, the top side 29, and the bottom side 21. The lure body attachment 11 is preferably made from an injection molded plastic material, as previously mentioned.

The left side 24 of the lure body attachment 11 includes the insert slot 30 with the opening 32 proximate the rear end 28 of the lure body attachment 11. The insert slot 30 terminates proximate the front end 22 of the lure body attachment 11 at the snap aperture 40. The insert slot 30 has at least one pair of the opposing flanges 50. The inserts 60 engage the insert slot 30 of the lure body attachment 11 in the same way as described for the insert slots of the fishing lure 10. The right side 26 of the lure body attachment 11 fixes to the fishing lure 12, and preferably a substantially flat or only slightly curved side of the fishing lure 12, typically with an adhesive such as a waterproof epoxy adhesive, or the like.

While a particular form of the invention has been illustrated and described, it will be apparent that various modifications can be made without departing from the spirit and scope of the invention. For example, the shape of the lure body 20 may vary greatly but still include the vital elements of the insert slot 30, catch 70, and inserts 60. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A fishing lure attachment comprising:
a lure body attachment having a front end, a rear end, a left side, a right side, a top side, and a bottom side;
the left side of the lure body attachment including an insert slot with an insert slot opening proximate the rear end of the lure body attachment, the insert slot terminating proximate the front end of the lure body attachment at a snap aperture of the lure body attachment, the insert slot having at least one pair of opposing flanges;
an insert for engaging the insert slot and having a catch at a forward end thereof adapted for engaging the snap aperture of the lure body attachment, and an outer surface visible through the insert slot between the at least one pair of opposing flanges when the insert is engaged with the insert slot; and
the right side of the lure body attachment adapted for attachment to a fishing lure;
whereby the lure body attachment is attached to the fishing lure, and the insert is inserted into the insert slot at the insert slot opening proximate the rear end of the lure body attachment until the catch at the forward end of the insert engages the snap aperture of the lure body attachment, the insert thereby contained within the insert slot, the insert removed from the lure body attachment by depressing the catch at the forward end of the insert to withdraw the catch from the snap aperture, thereby releasing the insert from the lure body attachment and allowing the insert to be slid away from the lure body attachment through the insert slot opening.

2. The fishing lure attachment of claim 1 wherein the lure body attachment is affixed with the fishing lure with an adhesive.

3. The fishing lure attachment of claim 1 wherein each insert includes a natural attractant fixed therewith and visible through the insert slot between the at least one pair of opposing flanges.

4. The fishing lure attachment of claim 1 wherein the insert slot includes a gap between the forward end of the insert and the lure body attachment to make room for the insert to be deformed inwardly when the catch is depressed to release the catch.

5. The fishing lure attachment of claim 1 wherein the lure body attachment includes one or more lure eyes fixed proximate the front end of the lure body attachment.

* * * * *